United States Patent Office 3,484,493
Patented Dec. 16, 1969

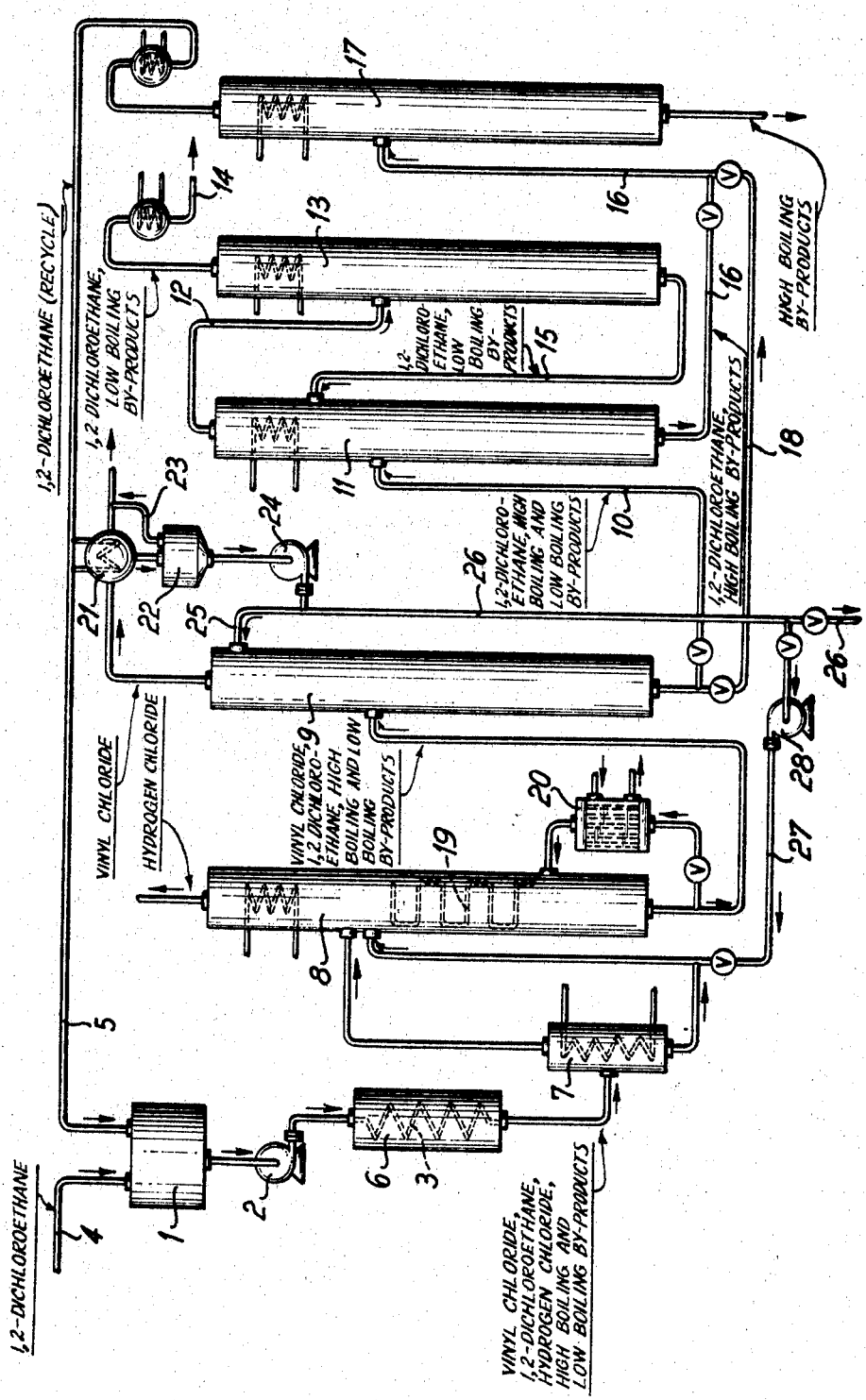

3,484,493
PROCESS FOR THE MANUFACTURE OF VINYL CHLORIDE FROM 1,2-DICHLOROETHANE
Hans Krekeler, Wiesbaden, Armin Jacobowsky, Knapsack, near Cologne, Klaus Born, Hermulheim, near Cologne, Heinz Schmitz, Frankfurt am Main, and Peter Wirtz, Cologne-Lindenthal, Germany, assignors to Knapsack Aktiengesellschaft, Knapsack, near Cologne, Germany, a corporation of Germany
Filed Feb. 3, 1967, Ser. No. 613,897
Claims priority, application Germany, Mar. 1, 1966, K 58,685
Int. Cl. C07c 17/34, 21/06
U.S. Cl. 260—656                         10 Claims

ABSTRACT OF THE DISCLOSURE

Process for the production of vinyl chloride by subjecting 1,2-dichloroethane to incomplete thermal cracking at elevated pressure and temperature, wherein gas mixture leaving the cracking zone is partially condensed, introduced into a first distillation zone, in which hydrogen chloride is distilled off, and introduced thereafter into a second distillation zone, in which vinyl chloride is distilled off, the process comprising drawing off a portion of liquefied vinyl chloride obtained as the head product of the second distillation zone and recycling that vinyl chloride portion approximately into the center portion of the first distillation zone.

---

The present invention relates to a process for making vinyl chloride by subjecting 1,2-dichloroethane to incomplete thermal cracking, at elevated pressure and at temperatures between about 450 to 650° C., in the absence of catalysts.

Vinyl chloride is one of the most important monomers for making plastic materials with their widespread uses. This fact underlines the importance attributed to the commercial production of vinyl chloride. As a result of the enlarged production facilities and the availability of new and more economic raw materials for the commercial production of vinyl chloride, attempts are being continued with the object of producing this monomer at lower price.

It is known (cf. German Patents 857,957 and 899,191; U.S. Patent 2,724,006; and British Patent 938,824) that vinyl chloride can be prepared in the absence of catalysts, in an empty steel tube, by subjecting pure 1,2-dichloroethane to thermal dehydrochlorination in the vapor phase, at elevated pressure (varying, e.g. between 9 and 38, preferably between 20 and 35 atmospheres abs.) and at temperatures between about 450 and about 650° C.

Undesirable side reactions are obviated by regulating the cracking temperature so as to allow no more than an about ⅔ proportion of the 1,2-dichloroethane to undergo reaction. The recovery in pure form of unreacted 1,2-dichloroethane (boiling point: 83° C.) by isolation of relatively low-boiling impurities so-called "low boiling fractions," substantially has not been described heretofore in literature. British Patent 938,824 cited above, alone uses a single distilling column for distilling off the low-boiling fractions from 1,2-dichloroethane which, however, is known also to contain impurities boiling at a temperature higher than 83° C., i.e. so-called high-boiling fractions. Heretofore, the 1,2-dichloroethane freed from the low-boiling fractions has subsequently been distilled to free it from the high-boiling fractions, and it has ultimately been refluxed with a purity, e.g. of 99.9% into the cracking furnace.

The low-boiling fractions formed on cracking dichloroethane into vinyl chloride and hydrogen chloride substantially comprise benzene, 2-chlorobutadiene-(1,3), 1,1-dichloroethylene, 1,1-dichloroethane, chloroform, methyl chloroform ethyl chloride, carbon tetrachloride and further hydrocarbons. As the boiling points, e.g. of benzene (80° C.) and 1,2-dichloroethane (83° C.) differ from one another by no more than 3 degrees, it has been necessary in earlier processes to separate the low-boiling fractions from the 1,2-dichloroethane by means of distilling columns of high separation efficiency, and simultaneously to use high reflux ratios. The presence of 2-chlorobutadiene-(1,3) which gives rise to the formation of polymers considerably handicaps the distillation.

Two distilling columns are customarily employed in industry for the separation of the low-boiling fractions from unreacted 1,2-dichloroethane with the object of obtaining, in the still of the first column, 1,2-dichloroethane freed practically completely from low-boiling fractions, and with the object of concentrating, in the second column, all of the components separated as the low-boiling fractions in admixture with 1,2-dichloroethane. During this operation, disturbances caused by polymer formation are encountered, particularly in the second column and the associated condenser including the reflux system and off-gas pipe.

A process considerably simplified with respect to the methods described above has been disclosed in U.S. patent application No. 570,585, which unexpectedly enables the low boiling fractions to be transformed, in the presence of 1,2-dichloroethane, into high-boiling fractions by subjecting the said mixture to thermal treatment at a temperature of 450 to 650° C., preferably 500 to 600° C. The transformation entails no formation of novel low or high-boiling components other than those obtained by the cracking of dichloroethane, wherein pure starting material is used.

The above application relates more especially to a process for making vinyl chloride by subjecting 1,2-dichloroethane to incomplete thermal cracking, at elevated pressure and temperatures between about 450 and 650° C. in the absence of catalysts, gas mixture leaving the cracking zone and formed of vinyl chloride, hydrogen chloride, unreacted 1,2-dichloroethane and of by-products including low-boiling fractions boiling at a temperature lower and high-boiling fractions boiling at a temperature higher than about 83° C. (760 mm. mercury), being partially condensed and introduced into a first distillation stage, in which the hydrogen chloride is distilled off, and being introduced thereafter into a second distillation stage, in which the vinyl chloride is distilled off, process wherein product accumulating in the sump of the second distilling stage is immediately introduced into a third distillation stage, of which the sump product, formed of high-boiling fractions, is expelled, and of which the head product, formed of a mixture comprising unreacted 1,2-dichloroethane and low-boiling fractions, is cooled and liquefied thereby, thereafter expelled and mixed with fresh 1,2-dichloroethane and the resulting mixture is recycled into the cracking zone.

The 1,2-dichloroethane cracking processes described or used heretofore will now be described in greater detail with reference to the accompanying flow scheme, to facilitate the understanding of the present invention which will be disclosed hereinafter.

A mixing vessel 1 supplying 1,2-dichloroethane by means of a pump 2 into a cracking tube 3 is charged with two streams 4, 5 of various dichloroethanes. These are formed of (a) 1,2-dichloroethane not transformed in the cracking process, which has been distilled to free it from by-products originating from the cracking reaction, and which is supplied through line 5, and of (b) fresh 1,2-dichloroethane which is supplied through line 4 to replace the 1,2-dichloroethane proportion consumed during the cracking and work-up. The mixture in mixing vessel 1 is formed, for example, of 56% fresh 1,2-dichloroethane and 44% recycled 1,2-dichloroethane.

The dichloroethane is introduced into cracking tube 3 at a rate of 9.38 tons/hr. under a pressure, e.g. of 27 atmospheres abs. The feed dichloroethane has a temperature of about 40° C. The cracking tube 3 is placed in a furnace 6 heated by means of fuel oil or gas. On traveling through cracking tube 3, the dichloroethane supplied while liquid is preheated first, thereafter vaporized, overheated and ultimately cracked at a temperature of about 500° C. The heating is regulated so as to permit no more than an about 56% proportion (generally 55–56%) of the dichloroethane to undergo conversion in the cracking zone of the cracking tube 3. The gas mixture leaving the cracking tube has a temperature of 525° C. under a pressure of 17 atmospheres absolute.

Under that pressure, the gas mixture is partially condensed at about 70° C. in cooler 7. The product portion which remains gaseous and the condensate are introduced into hydrogen chloride column 8 while the pressure is released to a value of about 12 atmospheres abs., column 8 having an associated expelling zone 19. The sump of column 8 can be heated by means of circulation evaporator 20, the liquid in the sump being cycled through a system of parallel thin pipes which are all placed inside a heating jacket. The heating jacket is heated by means of steam maintained under high pressure, say of 11 atmospheres abs., the steam transmitting the necessary heat and being thereafter allowed to leave the heating jacket under a pressure, for example, of 2 atmospheres abs. In that distillation stage 8, pure hydrogen chloride as the head product is recovered from the stream of cracking products supplied in liquid and vapor form. The hydrogen chloride is obtained at a rate of 1853 kg./hr. It is very pure and can be used for further syntheses.

The still product of column 8 contains the vinyl chloride formed in the cracking reaction (B.P.$_{760}$: −13.9° C.) together with unreacted 1,2-dichloroethane. While the pressure is released to a value of about 5 atmospheres abs., the mixture is introduced into a so-called vinyl chloride column 9, in which pure vinyl chloride (=3172 kg./hr.) is expelled from the head condensate of column 9. The still product of vinyl chloride column 9 contains the 1,2-dichloroethane not transformed in the cracking tube, and the low and high-boiling fractions formed in the cracking process. The temperature prevailing at the head of column 9 is maintained at 33° C., and the temperature prevailing in the still is maintained at 144° C. In order to enable that 1,2-dichloroethane to be recycled into the cracking process, crude recycle 1,2-dichloroethane issuing through the still of vinyl chloride column 9 is conveyed, while releasing the pressure to atmospheric, through line 10 into a first column 11 receiving low-boiling fractions, which are concentrated in the reflux zone of that column 11. The formation of polymers in column 11 is limited by introduction of a portion of the refluxed material through line 12 into a second column 13 also receiving low-boiling fractions. This permits maintaining approximately the following composition (in percent by weight) for the material refluxed in column 11:

| | |
|---|---|
| 1,2-dichloroethane | 94.50 |
| 1-chlorobutadiene-(1,3) | 2.20 |
| 1,1-dichloroethane | 1.76 |
| Benzene | 0.55 |
| Methylchloroform | 0.72 |
| Chloroform | 0.10 |
| Further constituents | 0.17 |

The portion of reflux material, which travels through line 12 into column 13 receiving the low-boiling fractions, is concentrated further therein until the material refluxed in that column 13 is found to contain 4.5% 2-chlorobutadiene-(1,3). In order to maintain that concentration of 2-chlorobutadiene-(1,3) in the reflux of column 13 receiving the low-boiling fractions, it is necessary, through line 14, to withdraw from the material refluxed in column 13 and ultimately to reject 150 kg./hr. of low-boiling fraction effluent containing about 89% 1,2-dichloroethane. The still of column 13 contains 1,2-dichloroethane slightly contaminated with low-boiling fractions, and it is recycled through line 15 into the upper portion of column 11.

The 1,2-dichloroethane issuing through the still of column 11 for the low-boiling fractions then exclusively contains high-boiling fractions. It is introduced through line 16 into column 17 receiving high-boiling fractions. The head product of that column 17 consists of pure recycled 1,2-dichloroethane, which is introduced through line 5 into mixing vessel 1 at a rate of 4130 kg./hr. 34 kg./hr. high-boiling fraction effluent (including 1,2-dichloroethane) are expelled from the still of column 17 receiving the high-boiling fractions, and rejected. The temperature prevailing at the head of column 17 is 83° C.

The process described above, wherein the low-boiling fractions are expelled in a form highly diluted with 1,2-dichloroethane, was found over a period of some months substantially to entail no operative disturbances by polymer formation in distillation stages 11 to 16 receiving the low-boiling fractions. It was found, however, considerably to reduce the yields in vinyl chloride and hydrogen chloride due to losses in 1,2-dichloroethane incurred on separation of the low-boiling fractions.

The principal feature in which the process described in the above application distinguishes over that just reported above resides in the fact that the product leaving the still of vinyl chloride column 9, and formed substantially of unreacted dichloroethane and low-boiling and high-boiling fractions which are by-products originating from the cracked 1,2-dichloroethane, is immediately introduced through line 18 into column 17 receiving the high-boiling fractions, while omitting the distillation stages 10 to 15 for the low-boiling fractions.

The head product of column 17 receiving the high-boiling fractions is formed of unreacted dichloroethane which contains all of the low-boiling fractions produced during the cracking operation, and it is returned through line 5 into mixing vessel 1.

Before the invention is disclosed in greater detail, it is interesting to make the following statements:

The substance mixture subjected to cracking is freed from hydrogen chloride by distillation. In view of the fact that hydrogen chloride has a boiling point of −85° C. at atmospheric pressure, it is convenient to achieve the separation by distillation under pressure. This enables the boiling point of the hydrogen chloride to be increased and frigorific energy to be economized. The dichloroethane being cracked to form vinyl chloride and hydrogen chloride under a pressure which preferably varies between 8 and 40 atmospheres abs.—this means for the cracking zone a very high throughput of about 30 kg. dichloroethane per hour and per liter of reaction space—it is possible to perform the pressure distillation, intended to separate hydrogen chloride from the vinyl chloride/dichloroethane-mixture, without need of a compression stage, provided that the hydrogen chloride is distilled off under a pressure equal to or lower than the pressure prevailing in the cracking zone.

Technical experience has shown that the hydrogen chloride-distillation should be carried out under a pressure not exceeding about 12–13 atmospheres abs. Higher pressure entails operational difficulties. The evaporator (e.g., circulation evaporator 20) associated with the hydrogen chloride column as well as the expelling stage 19 are then found to be subject to particularly rapid deposition of coke.

The object of the present invention is to provide means permitting, inter alia, the separation of hydrogen chloride, if desired, at relatively high distillation pressure, while obviating the difficulties mentioned above that arrest continuous production.

It has been found that the coking phenomena encountered during the work up, in the hydrogen chloride column, more especially in evaporator 20 associated with that column, of the substance mixture formed during the cracking operation, are a function of the boiling point of the product obtained in the still of that column, in which decomposition phenomena are found to take place increasingly when the pressure is increased, naturally with a corresponding increase in the boiling temperature of the still product. The still product is formed essentially of a mixture of vinyl chloride and unreacted dichloroethane. Vinyl chloride as an unsaturated compound being known very readily to undergo secondary reactions, it is clearly an unexpected result that considerably less coking is found to occur when the proportion of vinyl chloride in the still product of the hydrogen chloride-column is increased. The fact that other conventional methods for evaporation of material under mild conditions fail to produce comparably favorable results adds to the unexpectedness of the present result. For example, the column has been heated by means of an evaporator 20 designed to have an evaporating surface twice as large as that of a normal evaporator, which means smaller temperature difference between the steam used for heating and the product. Under a distillation pressure of 17 atmospheres abs., the above experiments have been found only to result in a prolonged operation period for the evaporator, i.e., the possible operation interval until cleansing of the evaporator 20 could be increased from 11 to 14 days.

The proportion of vinyl chloride present in the feed material or still product accumulating in the vinyl chloride column is increased in accordance with the present invention by cycling vinyl chloride between the hydrogen chloride column and the vinyl chloride column. The proportion of vinyl chloride cycled can be the smaller the higher the dichloroethane conversion rate produced on cracking. For example, at a dichloroethane conversion rate of 58%, referred to the dichloroethane subjected to cracking, the cycling of a 22% proportion of vinyl chloride, derived from the vinyl chloride produced (vinyl chloride yield=98-99%, referred to the dichloroethane conversion rate) is found to increase by about 150% the operation period of evaporator 20 associated with the hydrogen chloride column. This naturally means that considerably lesser coke is deposited in the expelling zone 19 of the hydrogen chloride column.

At a dichloroethane feed rate of 11.6 tons per hour, of which 57 to 60% undergoes conversion, the following relations are found to exist between the quantity of vinyl chloride cycled, the operating pressure prevailing in the hydrogen chloride column 8 and the operation period of evaporator 20.

| Quantity of vinyl chloride cycled | Operating pressure prevailing in HCl-column, atmos.abs. | Operation period of evaporator, days |
|---|---|---|
| None | 12.5 | 32 |
| Do | 15.0 | 15 |
| Do | 17.0 | 11 |
| 0.9 ton/hr | 13.0 | 75 |
| 0.9 ton/hr | 17.0 | 30 |
| 1.8 tons/hr | 17.0 | 40 |

When the evaporator is operated for a relatively long period, the substance mixture travelling from the still of column 8 to column 9 is naturally found to be soiled less, which accordingly means less soiling of the expelling stages and of the evaporators associated with columns 9, 11, and 17.

Naturally, the inventive feature of cycling the vinyl chloride between columns 8 and 9 does not depend on the operation of columns 11 and 13, which both receive the low-boiling fractions, or on their replacement by operation of line 18, which is preferred. In accordance with the present invention, the vinyl chloride can be cycled so as to enable the vinyl chloride distilling off at the head of column 9 to undergo complete condensation in cooler 21, the condensed matter being collected in separator 22 which has a vent line 23 connected thereto. vinyl chloride is continuously removed from separator 22 by means of pump 24 and a portion thereof is refluxed through line 25 to the head of column 9. A further portion can be withdrawn as pure product through line 26. The portion to be cycled, however, is drawn off from line 26 and introduced through line 27 into the supply line leading to column 8. Line 27 has a pump 28 associated therewith because column 8 is usually operated under a pressure higher than that prevailing in column 9.

As a result of the vinyl chloride being cycled between hydrogen chloride column 8 and vinyl chloride column 9, hydrogen chloride could for the first time be isolated from cracked dichloroethane under a distillation pressure up to about 21 atmospheres abs. The advantage offered thereby resides in the fact that the hydrogen chloride is then found to boil at higher temperatures, which is more economic.

Distillation pressure, atmospheres abs.                Boiling point of HCl, ° C.
11 _____ −30
13 _____ −25
15 _____ −20
17 _____ −16
19 _____ −12

Apart from the fact that refrigeration at higher temperatures entrains lesser operational expenditure than refrigeration at lower temperatures, it is possible to use low-cost, single-stage cold compressors, due to the increased distillation pressure in the HCl-column. The pressure increase in this distillation stage also means that smaller-dimensioned columns can be employed.

The present process for the manufacture of vinyl chloride by subjecting 1,2-dichloroethane to incomplete thermal cracking in a cracking zone, at elevated pressure, which preferably varies between 8 and 40 atmospheres abs., at temperatures between about 450 and 650° C. in the absence of catalysts, wherein gas mixture leaving the cracking zone and formed of vinyl chloride, hydrogen chloride, unreacted 1,2-dichloroethane and of by-products including low-boiling fractions boiling at a temperature lower and high-boiling fractions boiling at a temperature higher than about 83° C. (760 mm. mercury), is partially condensed and introduced into a first distillation stage, in which the hydrogen chloride is distilled off, and introduced thereafter into a second distillation stage, in which the vinyl chloride is distlled off, and of whch the sump product is either immediately introduced into a last distillation stage, of which the sump product, formed of high-boiling fractions, is expelled, and of which the head product, formed of a mixture comprising unreacted 1,2-dichloroethane and low-boiling fractions, is cooled and liquefied thereby, expelled and mixed thereafter with fresh 1,2-dichloroethane, and the resulting mixture is recycled into the cracking zone, or wherein the sump product of the second distillation stage is freed in conventional manner from the low-boiling fractions by distilling it and the remaining mixture, formed of high-boiling fractions and unreacted 1,2-dichloroethane, is introduced into the last distallation stage, of which the sump product, formed of high-boiling fractions is expelled, and of which the head product, formed of unreacted 1,2-dichloroethane is cooled and thereby liquefied, expelled and mixed thereafter with fresh 1,2-dichloroethane, and the resulting mixture is recycled into the cracking zone, comprises more especially drawing off a portion of vinyl chloride, expelled at the head of the second distillation stage and liquefied, and repumping that vinyl chloride portion approximately to the center portion of the first distillation stage in which the hydrogen chloride is distilled off.

5 to 50%, preferably 10 to 25%, of the vinyl chloride produced can be drawn off to be recyled by means of a pump.

The first distillation stage, in which the hydrogen chloride is distilled off, should conveniently be operated under a pressure between 8 and 21, preferably 15 and 21 atmospheres abs.

The pressure prevailing in the cracking zone should be as high as or higher than that prevailing in the first distillation zone.

EXAMPLE 1 (Prior art process)

11.6 tons per hour liquid 1,2-dichloroethane were introduced under a pressure of 33 atmospheres abs. into cracking furnace 6. The 1,2-dichloroethane travelled through externally heated tube 3, in which it was preheated and evaporated and ultimately superheated and cracked. The heat necessary to produce the cracking was so supplied that 58% of the dichloroethane was cracked to form vinyl chloride and hydrogen chloride. The cracked gas issued from cracking furnace 6 under a pressure of 21 atmospheres abs. and travelled to cooler 7 in which it was partially liquefied. All of the cracked product, which was partially liquid and partially gaseous, was then introduced into column 8 to distill off hydrogen chloride. The distillation was carried out under a pressure of 12.5 atmospheres abs., the temperature in the still of the column being 100° C.

Within a few days, the pressure at the hot steam side of the evaporator 20 was found to increase. The pressure increase was an index of the increasing degree of soiling at the product side, that is to say inside the pipes of evaporator 20. The wall coating inside the thin pipes was found to handicap the regular transmission of heat from the superheated steam to the liquid travelling through the pipes. The steam used for heating failed to undergo the intended decrease in pressure and the circulating liquid failed to become warm enough. While the hot steam pressure is, for example, equal to about 2 atmospheres absolute in a clean evaporator, it is found, within a period of 32 days, to increase to about 9 atmosphere absolute. The evaporator is then found to have so considerably a decreased efficiency that operation must be discontinued to cleanse the evaporator. Failing this, the hydrogen chloride commences to penetrate through the still product into the following vinyl chloride column 9.

EXAMPLE 2 (PRIOR ART PROCESS)

The procedure was the same as that described in Example 1, save that the operating pressure in column 8 was increased from 12.5 to 17.0 atmospheres absolute. The pressure increase was found to produce a temperature increase in the still from 100 to 114° C. The evaporator 20, which had been cleansed before the experiment was started, was required to be stopped after no more than 11 days of operation and to be cleansed again.

EXAMPLE (PROCESS OF INVENTION)

The procedure was the same as that described in Examples 1 and 2 but with the following modifications:

A portion of the liquefied head product of vinyl chloride column 9 was drawn off at the pressure side of reflux pump 24 and added through lines 26 and 27, through a volumeter and a quantity control means to the liquid feed product (crack product) supplied to the hydrogen chloride column. In other words, vinyl chloride was cycled between hydrogen chloride column 8 and the following vinyl chloride column 9. To surmount the pressure difference between the vinyl chloride column and the hydrogen chloride column, it may be necessary to use a pressure-amplifying pump 28. Hydrogen chloride column 8 was operated under a pressure of 13 atmospheres absolute, 0.8 ton/hr. vinyl chloride (=19% of the vinyl chloride produced) being cycled. This resulted in a decrease of the temperature prevailing in the still of column 8 to 92° C. These conditions enabled evaporator 20 to be operated for a period of 75 days.

EXAMPLE 4 (PROCESS OF INVENTION)

The procedure was the same as that described in Example 3, save that the distillation pressure in column 8 was increased from 13 to 17 atmospheres absolute. As compared with the procedure using no vinyl chloride cycle, the temperature prevailing in the still of column 8 was found to have dropped from 114 to 102° C. Under these conditions, the evaporator 20 could be operated for a period averaging 30 days.

We claim:

1. In the process for the manufacture of vinyl chloride by subjecting 1,2-dichloroethane to incomplete thermal cracking in a cracking zone, at elevated pressure and temperatures between about 450 and 650° C., in the absence of catalysts, wherein gas mixture leaving the cracking zone and formed of vinyl chloride, hydrogen chloride, unreacted 1,2-dichloroethane and of by-products including low-boiling fractions boiling at a temperature lower than 83° C. (760 mm. mercury) and high-boiling fractions boiling at a temperature higher than 83° C. (760 mm. mercury), is partially condensed and introduced into a first distillation zone, in which the hydrogen chloride is distilled off, and introduced thereafter into a second distillation zone, in which the vinyl chloride is distilled off and liquefied, the improvement which comprises recycling a portion of the liquefied vinyl chloride approximately into the center portion of the first distillation zone, in which the hydrogen chloride is distilled off.

2. The process of claim 1, wherein the 1,2-dichloroethane is thermally cracked under a pressure of about 8 to 40 atmospheres absolute.

3. The process of claim 1, wherein product accumulating in the sump of the second distillation zone is immediately introduced into a last distillation zone, of which the sump product, formed of the high-boiling fractions, is expelled, and of which the head product, formed of a mixture comprising unreacted 1,2-dichloroethane and the low-boiling fractions, is cooled and liquefied thereby, expelled and mixed with fresh 1,2-dichloroethane, and the resulting mixture is recycled into the cracking zone.

4. The process of claim 1, wherein the sump product of the second distillation zone is distilled to free it from the low-boiling fractions, the remaining mixture, formed of the high-boiling fractions and unreacted 1,2-dichloroethane, is introduced into the last distillation zone, of which the sump product, formed of the high-boiling fractions, is expelled, and of which the head product, formed of liquid, unreacted 1,2-dichloroethane, is expelled and mixed with fresh 1,2-dichloroethane and the resulting mixture is recycled into the cracking zone.

5. The process of claim 1, wherein 5 to 50% of the vinyl chloride produced is recycled.

6. The process of claim 5, wherein 10 to 25% of the vinyl chloride produced is recycled.

7. The process of claim 1, wherein the first distillation zone, in which the hydrogen chloride is distilled off, is operated under a pressure between 8 and 21 atmospheres absolute.

8. The process of claim 7, wherein the first distillation zone is operated under a pressure between 15 and 21 atmospheres absolute.

9. The process of claim 7, wherein the cracking zone is operated under a pressure as high as that used in the first distillation zone.

10. The process of claim 7, wherein the cracking zone is operated under a pressure higher than that used in the first distillation zone.

References Cited

UNITED STATES PATENTS 2,724,006  11/1955  Krekeler _____ 260—656

LEON ZITVER, Primary Examiner

J. BOSKA, Assistant Examiner

U.S. Cl. X.R.

203—84